United States Patent
Walton

(10) Patent No.: US 8,228,563 B2
(45) Date of Patent: Jul. 24, 2012

(54) WATERMARKING A PAGE DESCRIPTION LANGUAGE FILE

(75) Inventor: Scott E. Walton, Salem, OR (US)

(73) Assignee: Digimarc Corporation, Beaverton, OR (US)

( * ) Notice: Subject to any disclaimer, the term of this patent is extended or adjusted under 35 U.S.C. 154(b) by 1092 days.

(21) Appl. No.: 11/142,827

(22) Filed: May 31, 2005

(65) Prior Publication Data

US 2005/0286948 A1    Dec. 29, 2005

Related U.S. Application Data

(63) Continuation of application No. 10/066,116, filed on Jan. 30, 2002, now Pat. No. 6,899,475.

(51) Int. Cl.
*G06K 15/00* (2006.01)
*G06K 1/00* (2006.01)

(52) U.S. Cl. ........................ 358/3.28; 358/1.9

(58) Field of Classification Search .............. 358/3.28, 358/1.9, 1.11–1.18, 1.1; 382/100, 1.9
See application file for complete search history.

(56) References Cited

U.S. PATENT DOCUMENTS

| | | |
|---|---|---|
| 4,790,566 A | 12/1988 | Boissier et al. |
| 4,908,873 A | 3/1990 | Philibert et al. |
| 5,091,966 A | 2/1992 | Bloomberg |
| 5,243,423 A | 9/1993 | DeJean et al. |
| 5,388,194 A | 2/1995 | Vogel |
| 5,481,294 A | 1/1996 | Thomas et al. |
| 5,481,377 A | 1/1996 | Udagawa et al. |
| 5,509,074 A | 4/1996 | Choudhury |
| 5,515,451 A | 5/1996 | Tsuji et al. |
| 5,644,682 A | 7/1997 | Weinberger et al. |
| 5,652,626 A | 7/1997 | Kawakami et al. |
| 5,689,626 A | 11/1997 | Conley |
| 5,713,032 A | 1/1998 | Spenser |
| 5,739,864 A | 4/1998 | Copeland |
| 5,772,250 A | 6/1998 | Gasper |
| 5,778,102 A | 7/1998 | Sandford, II |
| 5,843,564 A | 12/1998 | Gasper et al. |
| 5,848,155 A | 12/1998 | Cox |
| 5,901,224 A | 5/1999 | Hecht |
| 5,905,800 A | 5/1999 | Moskowitz et al. |
| 5,919,730 A | 7/1999 | Gasper |
| 5,946,414 A | 8/1999 | Cass et al. |
| 5,949,055 A | 9/1999 | Fleet et al. |

(Continued)

FOREIGN PATENT DOCUMENTS

EP     493091     7/1992

(Continued)

OTHER PUBLICATIONS

Amano, et al., "A Feature Calibration Method for Watermarking of Document Images," Proc. 5th Int'l Conf on Document Analysis and Recognition, pp. 91-94, 1999.

(Continued)

*Primary Examiner* — Thierry Pham

(57) ABSTRACT

The present invention provides methods and systems for steganographically encoding a file which is in a page description language (PDL) such as PostScript. Aspects of the present invention can be used to: i) encode a PDL file and generate an encoded PDL file; and ii) provide an "interpreter" which generates raster images from a PDL file. Portions of the raster images can be steganographically encoded. Encoded raster images can be printed or the raster images can be combined into a new PDL file.

13 Claims, 5 Drawing Sheets

U.S. PATENT DOCUMENTS

| | | |
|---|---|---|
| 6,044,156 A | 3/2000 | Honsinger et al. |
| 6,064,764 A | 5/2000 | Bhaskaran et al. |
| 6,086,706 A | 7/2000 | Brassil |
| 6,104,812 A | 8/2000 | Koltai et al. |
| 6,122,403 A | 9/2000 | Rhoads |
| 6,154,484 A | 11/2000 | Lee et al. |
| 6,185,316 B1 | 2/2001 | Buffam |
| 6,185,683 B1 | 2/2001 | Ginter et al. |
| 6,201,879 B1 | 3/2001 | Bender et al. |
| 6,208,735 B1 | 3/2001 | Cox et al. |
| 6,233,684 B1 | 5/2001 | Stefik et al. |
| 6,263,086 B1 | 7/2001 | Wang |
| 6,282,654 B1 | 8/2001 | Ikeda et al. |
| 6,297,491 B1 | 10/2001 | Mangerson |
| 6,311,214 B1 | 10/2001 | Rhoads |
| 6,325,420 B1 | 12/2001 | Zhang |
| 6,332,149 B1 * | 12/2001 | Warmus et al. ............... 715/246 |
| 6,334,721 B1 | 1/2002 | Horigane |
| 6,343,204 B1 | 1/2002 | Yang |
| 6,345,104 B1 * | 2/2002 | Rhoads ......................... 382/100 |
| 6,351,815 B1 | 2/2002 | Adams |
| 6,396,594 B1 | 5/2002 | French |
| 6,411,392 B1 | 6/2002 | Bender et al. |
| 6,427,020 B1 | 7/2002 | Rhoads |
| 6,449,377 B1 | 9/2002 | Rhoads |
| 6,456,393 B1 | 9/2002 | Bhattacharjya et al. |
| 6,457,883 B1 | 10/2002 | Silverbrooke et al. |
| 6,505,779 B1 | 1/2003 | Power et al. |
| 6,538,763 B1 | 3/2003 | Klosterman |
| 6,549,638 B2 | 4/2003 | Davis |
| 6,557,103 B1 | 4/2003 | Boncelet et al. |
| 6,567,534 B1 | 5/2003 | Rhoads |
| 6,636,613 B1 | 10/2003 | Schwenk |
| 6,681,029 B1 | 1/2004 | Rhoads |
| 6,694,042 B2 | 2/2004 | Seder |
| 6,694,043 B2 | 2/2004 | Seder et al. |
| 6,763,122 B1 | 7/2004 | Rodriguez et al. |
| 6,769,061 B1 | 7/2004 | Ahern |
| 6,771,820 B1 | 8/2004 | Oakeson |
| 6,782,509 B1 * | 8/2004 | Hirayama et al. ............ 715/210 |
| 6,804,377 B2 | 10/2004 | Reed et al. |
| 6,899,475 B2 | 5/2005 | Walton |
| 7,017,043 B1 | 3/2006 | Potkonjak |
| 7,068,391 B2 * | 6/2006 | Dewitte et al. ................ 358/1.9 |
| 7,194,106 B2 | 3/2007 | Brundage et al. |
| 7,239,734 B2 | 7/2007 | Alattar et al. |
| 7,555,139 B2 | 6/2009 | Rhoads et al. |
| 7,657,064 B1 | 2/2010 | Conwell |
| 2001/0006551 A1 | 7/2001 | Masaki |
| 2001/0006585 A1 | 7/2001 | Horigane |
| 2001/0007130 A1 | 7/2001 | Takaragi |
| 2001/0017704 A1 | 8/2001 | Akiyama |
| 2001/0017709 A1 | 8/2001 | Murakami |
| 2001/0023421 A1 | 9/2001 | Numao |
| 2001/0030759 A1 | 10/2001 | Hayashi |
| 2001/0051996 A1 | 12/2001 | Cooper et al. |
| 2001/0053299 A1 | 12/2001 | Matsunoshita |
| 2001/0054146 A1 | 12/2001 | Carro et al. |
| 2001/0054150 A1 * | 12/2001 | Levy .............................. 713/176 |
| 2002/0012444 A1 | 1/2002 | Nishikawa |
| 2002/0013794 A1 | 1/2002 | Carro et al. |
| 2002/0018223 A1 | 2/2002 | Kashihara |
| 2002/0180997 A1 * | 12/2002 | Rozzi ............................. 358/1.9 |
| 2003/0140315 A1 * | 7/2003 | Blumberg et al. ............ 715/527 |
| 2003/0142361 A1 * | 7/2003 | Walton ......................... 358/3.28 |
| 2003/0165253 A1 | 9/2003 | Simpson et al. |
| 2003/0231785 A1 | 12/2003 | Rhoads |
| 2004/0189682 A1 | 9/2004 | Troyansky et al. |
| 2004/0236716 A1 | 11/2004 | Carro |
| 2005/0030588 A1 * | 2/2005 | Reese et al. .................. 358/3.28 |
| 2005/0039021 A1 | 2/2005 | Alattar et al. |
| 2005/0111047 A1 | 5/2005 | Rhoads |
| 2005/0262490 A1 | 11/2005 | Thomborson et al. |
| 2006/0028689 A1 | 2/2006 | Perry et al. |
| 2007/0244693 A1 | 10/2007 | Atallah et al. |

FOREIGN PATENT DOCUMENTS

| | | |
|---|---|---|
| EP | 1156662 | 7/2000 |
| JP | 8-50598 | 2/1996 |
| WO | WO 9740619 | 10/1997 |
| WO | WO 01/74053 | 10/2001 |
| WO | WO0197175 | 12/2001 |
| WO | WO 02/03328 | 1/2002 |
| WO | WO0201379 | 1/2002 |
| WO | WO0211326 | 2/2002 |
| WO | WO0211446 | 2/2002 |
| WO | WO 0225599 | 3/2002 |

OTHER PUBLICATIONS

Bloomberg, "Embedding Digital Data on Paper in Iconic Text," SPIE, vol. 3027, pp. 67-80 (1997).

Boland, "Watermarking Digital Images for Copyright Protection," Fifth International Conf. on Image Processing and its Applications, Conf. Publ. No. 410; pp. 326-330, 1995.

Brassil, "Electronic Marking and Identification Techniques to Discourage Document Copying," Proceedings of INFOCOM '94 Conference on Computer, IEEE Comm. Soc Conference, Jun. 12-16, 1994, pp. 1278-1287.

Brassil, "Hiding Information in Document Images," Nov. 1995, 7 pages, AT&T Bell Laboratories Technical Report.

Cox, et al., "Secure Spread Spectrum Watermarking or Multimedia," NEC Research Iustitute Technical Report No. 95-10, 1995.

Gruhl et al., "Information Hiding to Foil the Casual Counterfeiter," Proc. 2nd Int'l Workshop on Information Hiding, Apr. 14-17, 1998, pp. 1-15.

Kawaguchi et al., "Principle and Applications of BPCS-Steganography," Proc. SPIE vol. 3528: Multimedia Systems and Applications, Nov. 2-4, 1998. pp. 464-473.

Komatsu et al., "A Proposal on Digital Watermarking in Document Image Communication and Its Application to Realizing a Signature," Electronics and Communications in Japan, Part I, vol. 73, No. 5, 1990, pp. 22-23.

Komatsu et al., "Authentication System Using Concealed Image in Telematics," Memoirs of the School of Science & Engineering, Waseda Univ., No. 52, 1988, pp. 45-60.

Koch, "Copyright Protection for Multimedia Data," Proc. Of the Int. Conf. On Digital Media and Electronic Publishing, Leeds, U.K., 15 pages (1994).

Merz, "Ghostscript User Manual," chapters 1-6 (1997).

Nakamura, Embedding Signature into Japanese printed Documents for Copyright Protection, Inform. Proc. Soc. of Japan, Nat'l Meeting Lecture Papers 3, Mar. 15, 1995, pp. 3-203 to 3-204.

Nakamura et al., "A Unified Coding Method of Dithered Image and Text Data Using Micropatterns," Electronics and Comms. in Japan, Part 1, vol. 72, No. 4, 1989, pp. 50-56.

Nakamura et al., "A Unified Coding Method of Image and Text Data Using Discrete Orthogonal Transform," Systems and Computers in Japan, vol. 21, No. 3, 1990, pp. 87-92.

Tanaka et al., "Embedding Secret Information into a Dithered Multi-level Image," IEEE, pp. 216-220, 1990.

Tanaka et al., "A Visual Retrieval System with Private Information for Image Database," Proc. Int'l Conf. on DSP Appl. & Tech., pp. 415-421, Oct. 1991.

Xydeas et al., "Embedding Data Into Pictures by Modulo Masking," IEEE Transactions on Communications, 1984, vol. COM-32, No. 1, pp. 56-69.

Zhao, "Embedding Robust Labels into Images for Copyright Protection," Proc. Of the International Congress on Intellectual Property Rights for Specialized Information, Knowledge and New Technologies, 10 pages (1995).

Notice of Allowance on U.S. Appl. No. 10/066,116, mailed Aug. 11, 2004.

Notice of Allowance on U.S. Appl. No. 10/066,116, mailed Mar. 3, 2004.

\* cited by examiner

WATERMARKING A PAGE DESCRIPTION LANGUAGE FILE

RELATED APPLICATION DATA

This application is a continuation of U.S. patent application Ser. No. 10/066,116, filed Jan. 30, 2002 (now U.S. Pat. No. 6,899,475). These patent documents are hereby incorporated by reference.

FIELD OF THE INVENTION

The present invention relates to computer technology and more particularly to digital watermarking technology.

BACKGROUND

A printed page may include graphics, text and images. The graphics, text and images on a page are positioned at specific places on the page to provide a desired effect. A page description language (PDL) is generally used to provide instructions to a printer concerning how the graphics, text and images should be positioned on a page.

In most situations, an "interpreter" in the printer accepts the instructions provided by the PDL along with the necessary graphic, text and image objects. The interpreter generates appropriate raster image files to position of the ink dots which will form the desired printed page. PostScript™ which was developed by Adobe Systems Corporation is the most widely used PDL; however, there are many other PDLs that have been defined.

The page layout program PageMaker™ marketed by Adobe Systems Corporation is in widespread use to generate PostScript files. While the PageMaker program is in widespread use there are also are other somewhat similar programs such as those marketed under the trademarks "Quark Express" and "InDesign".

A number of available interpreters take PostScript files and generate the raster images required by printers. One such interpreter is marketed by Adobe Systems. Another such interpreter is marketed under the trademark "PhonenixPage" by Xionics Document Technologies. Still another PostScript interpreter called "Ghostscript™" is freely available at various internet sites under the "Aladdin Ghostscript Free Public License".

Programs that can insert digital watermarks into images are in widespread use. For example the widely used image editing program "Photoshop™" includes a mechanism for inserting a watermark into an image.

SUMMARY OF THE PRESENT INVENTION

The present invention provides a method and system for watermarking a file which is in a PDL such as PostScript. The present invention can be used to either watermark a PDL file and then generate a watermarked PDL file or the present invention can be part of the interpreter in a printer which takes a file in a PDL and which then generates watermarked raster images which are printed.

The present invention includes an "interpreter" which generates raster images from the PDL file. The raster images are then watermarked using conventional watermarking techniques. Next the raster images are either printed (if the interpreter is part of a printer) or the raster images are combined into a new PDL file.

The specific embodiment shown relates to a PostScript file; however, it should be understood that the invention can also be applied to files in other page description languages. PostScript is merely used as an example.

DESCRIPTION OF PREFERRED EMBODIMENT

The preferred embodiment of the present invention provides a method and system for watermarking a PostScript file. Due to its construction and format, a file in a PDL such as PostScript can not be watermarked using the conventional watermarking programs such as that which is part of the Photoshop program. The preferred embodiment of the present invention is directed to watermarking a PostScript file; however, it should be understood that the invention can also be used to watermark files in various other PDL languages.

The preferred embodiment utilizes elements from the Ghostscript interpreter. The source code for the Ghostscript interpreter is freely available at various internet web sites under the "Aladdin Ghostscript Free Public License". It should be understood that while the preferred embodiment utilizes the Ghostscript interpreter, the invention can be used with other PostScript interpreters and with other PDLs.

Figure 1:
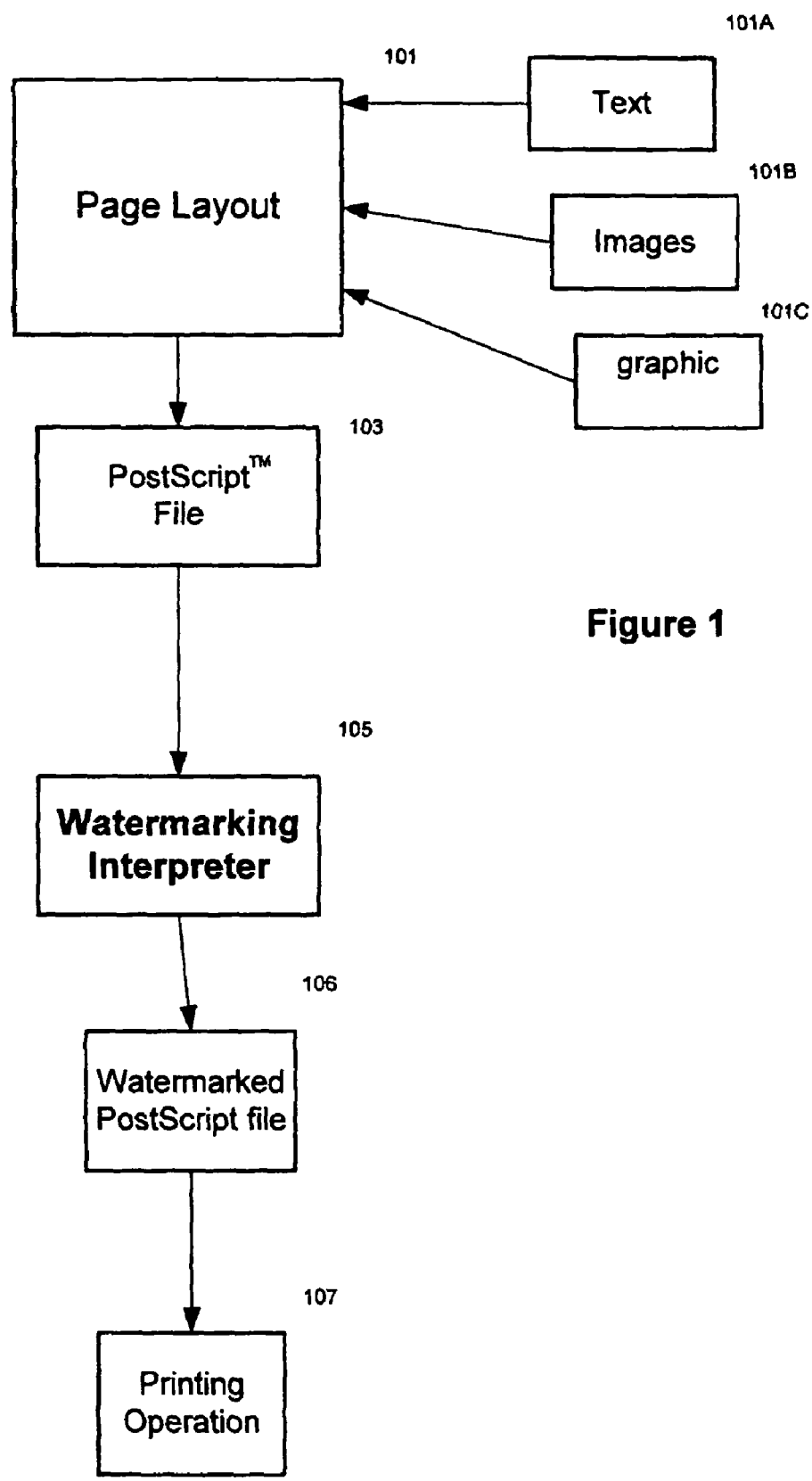
FIG. 1 is an overall flow diagram of the process.

The overall operation of the invention is illustrated in FIG. 1. The process begins as indicated by block 101. A page layout program such as PageMaker is used to generate a PostScript file 103. The page layout program combines text 101A, images 101B and graphics 101C with appropriate instructions and codes, to produce the desired lay out of a page. Such page layout is conventional and it results in a PostScript file 103. The PostScript file 103 is passed to a watermarking interpreter 105 which add an appropriate watermark and then generates a new watermarked PostScript file 106. The details of the watermarking interpreter are described below. Finally PostScript file 106 is provided to a printer which prints the desired page.

Figure 2:
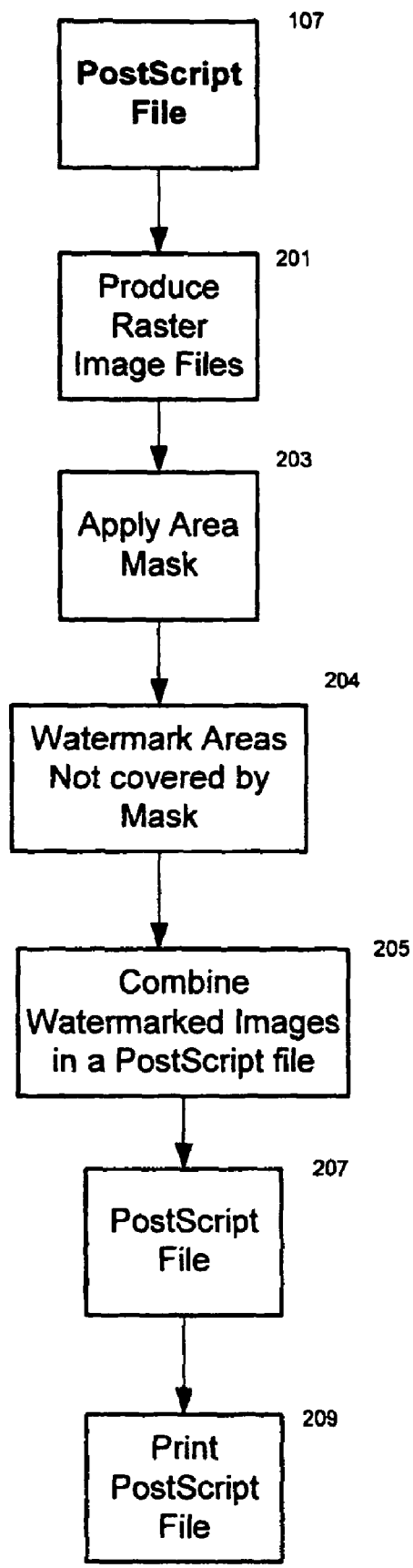
FIG. 2 is a flow diagram of the operation that take place in the watermark interpreter.

FIG. 2 illustrates the operations performed by the watermarking interpreter 105. First the watermarking interpreter generates the appropriate raster images as indicated by block 201. A conventional interpreter mechanism, such as that available in the Ghostscript interpreter can be used to generate the raster image files. A block diagram of such a mechanism is provided in FIG. 5. Next, as indicated by blocks 203 and 204, the areas in each raster image indicated by mask 401 (mask 401 is explained later) are watermarked. That is, the bits in the area indicated by mask 401 are watermarked using conventional watermarking technology. Next as indicated by block 205, the watermarked raster images are combined into a new postscript file 207. That is, a simple compiler program adds simple PostScript commands and combines the four raster images into a new PostScript file 207. Creating such a Postscript file from the four raster images uses conventional technology known in the art. Finally the PostScript file 207 is sent to a printer which prints the PostScript file using conventional technology. Naturally the file 207 may be stored on conventional storage mechanisms and electronically transmitted if desired prior to printing.

Figure 3:
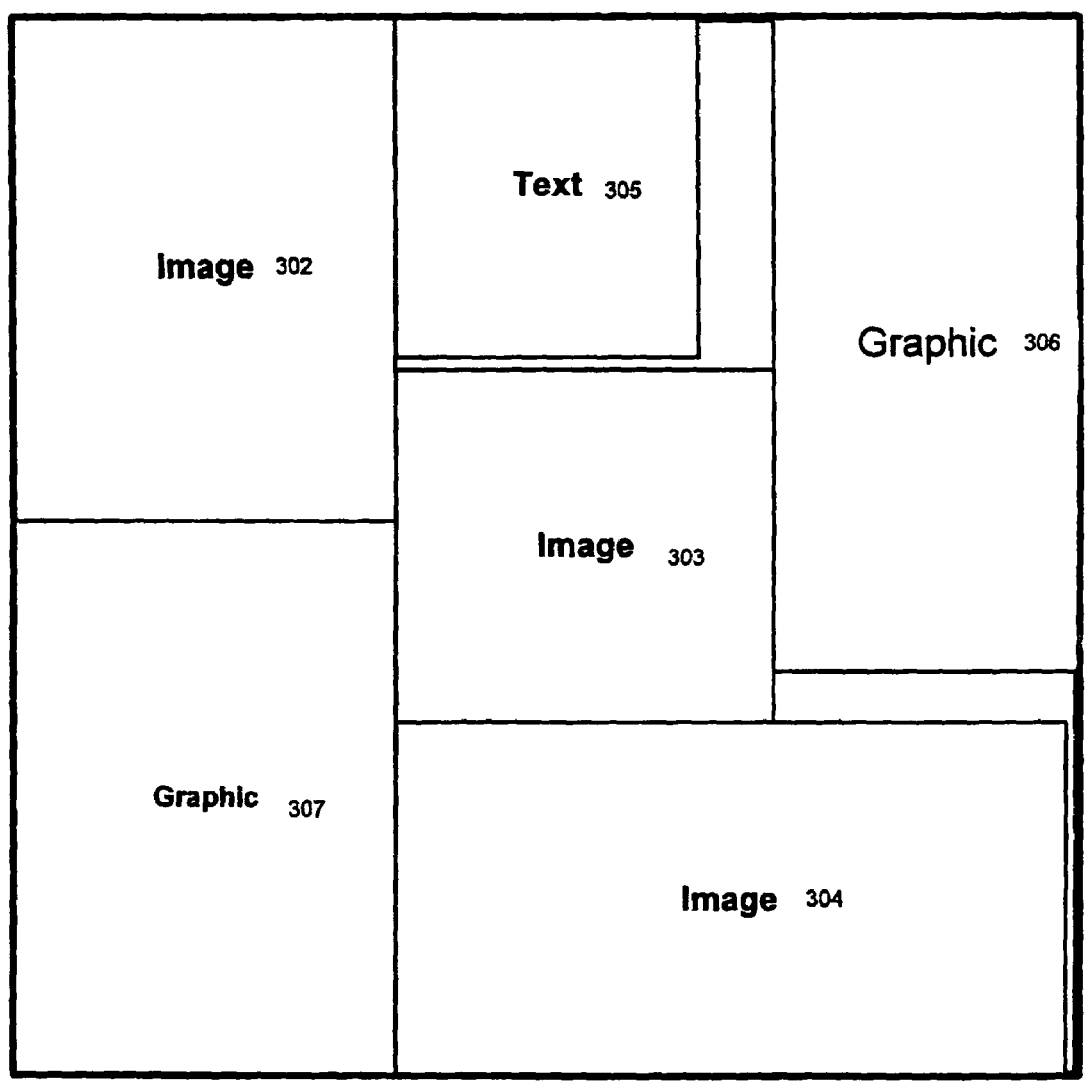
FIG. 3 is a block diagram of a PostScript Interpreter.

As indicated in FIG. 3, a printed page may contain a combination of images, text and graphics. The page shown in FIG.

3 includes images 302, 303, and 304, text 305 and graphics 306 and 307. It should be understood that the page illustrated is merely an example and a page may have a simple or complicated arrangement of text, images and graphics.

Figure 4:
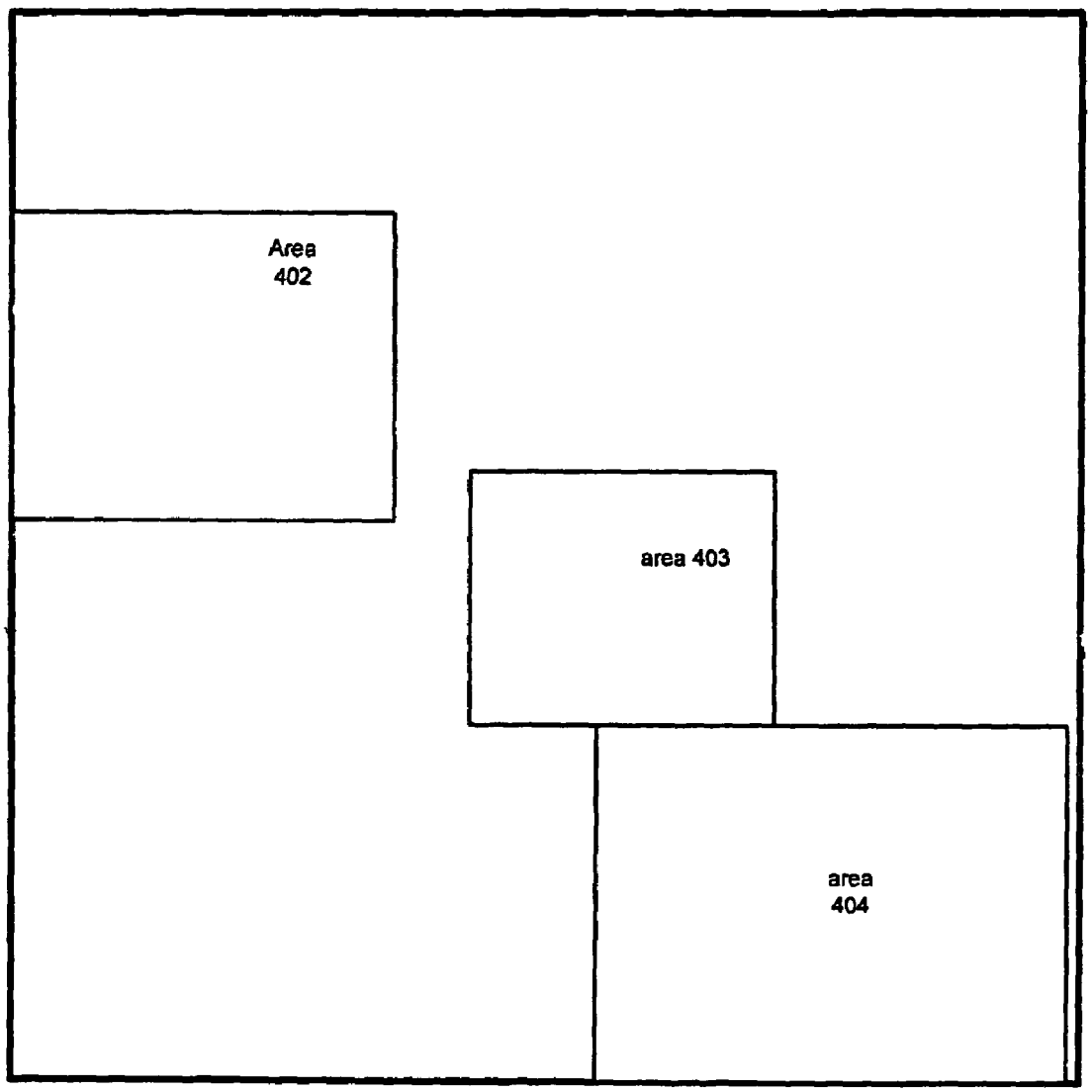
FIG. 4 shows a mask which defines areas in an image.

In order to avoid creating visual artifacts, it may be desirable to only watermark selected portions of a page. A mask such as that shown in FIG. 4 may be used. In the example shown the mask 401 indicates the areas where a watermarking signal should be applied. It should be understood that mask 401 is not a physical object. It is merely a designation of the areas in a page where a watermark should be applied. That is, areas where the pixels should be "tweaked" in order to apply a watermark to the page. Instead of showing areas where the page should be watermarked, the mask could alternatively show areas that should not be watermarked. The area selected for watermarking are generally areas where the application of a watermark signal will not materially degrade the image.

The raster image files are watermarked using conventional watermarking technology that specifies how various bits should be changed in order to embed a watermark. For example co-pending application Ser. No. 09/694,465 entitled "Watermarking an Image in Color Plane Separations and reading such watermarks" describes technology which could be used to watermark the raster images. The content of application Ser. No. 09/694,465 (now U.S. Pat. No. 6,763,122) is hereby incorporated herein by reference.

Prior to changing any bit in one of the raster images, the mask 401 is interrogated to determine if the particular bit is in a location where it is desired to apply a watermark. If the particular bit is located in the area of mask 401 indicating that the area should be watermarked, the bit is changed, otherwise the bit is not changed.

Figure 5:
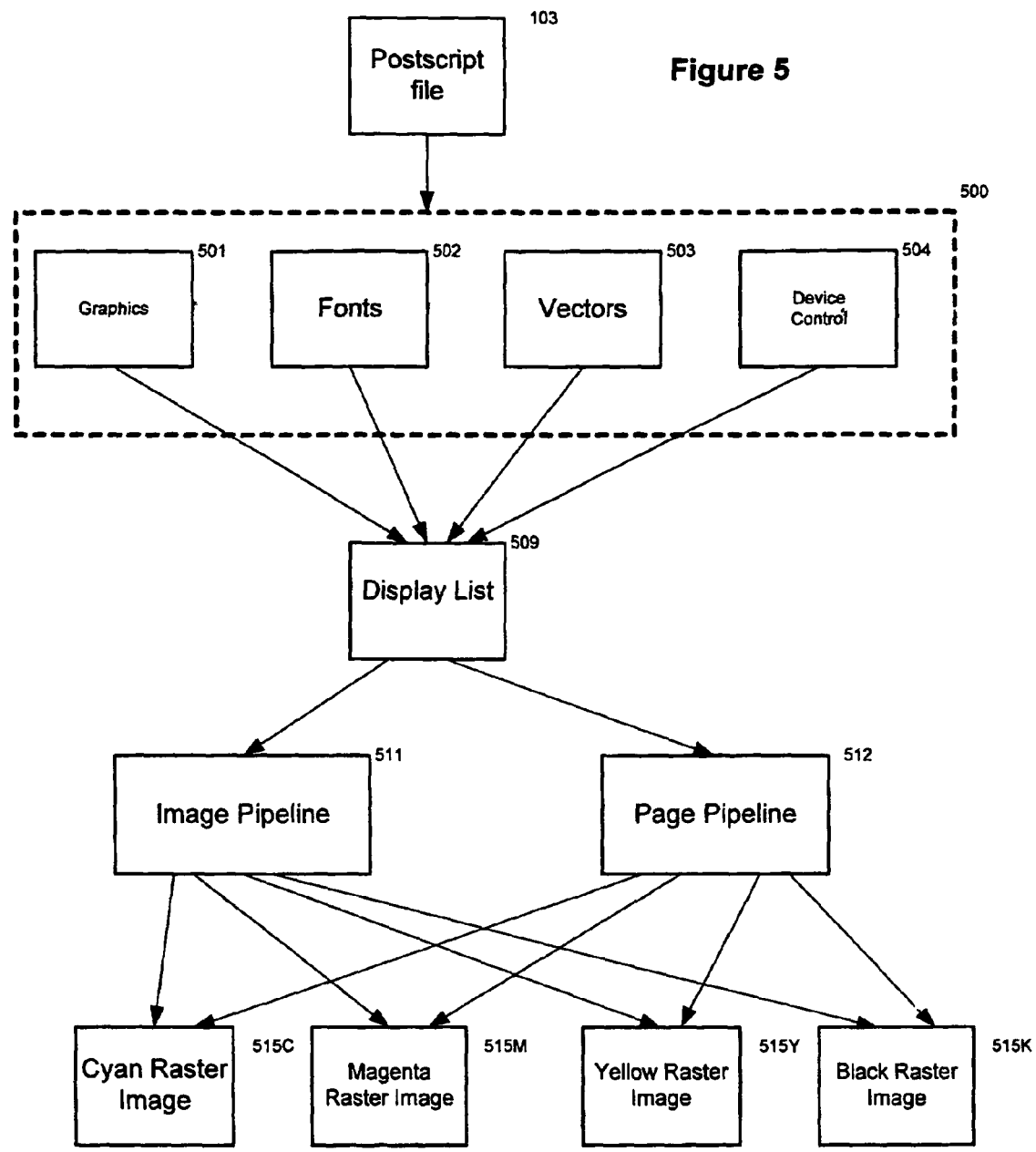
FIG. 5 is a block diagram of an interpreter.

A block diagram of the watermarking interpreter 105 is shown in FIG. 5. The watermarking interpreter 105 utilizes the well known components of the Ghostscript interpreter. Further details of the Ghostscript interpreter can be found in sources such as the "Ghostscript User Manual" by Thomas Merz (1996-97) which is widely available on the world wide web.

As indicated in FIG. 5 the interpreter takes the graphics 501, the fonts 502, the vectors 503 and the device controls 504 (there also may be other elements) and creates a display list 509. The display list provides information for an image pipeline 511 and a page pipeline 512. The output of pipelines 511 and 512 is the raster image files. In the example illustrated the raster images are CMYK images, 515C, 5165M, 515Y and 515K. Naturally in other environments these could be other types of raster images. The publicly available source code for the Ghostscript interpreter provides a mechanism for implementing the elements shown in FIG. 5.

Each of the raster images 515C to 516K are then watermarked as indicated in FIG. 2. This can be done as shown in co-pending application Ser. No. 09/694,465 entitled "Watermarking an Image in Color Plane Separations and reading such watermarks" which in incorporated herein by reference. These images are only watermarked in the areas indicated by mask 401. The result is four watermarked raster images.

In the preferred embodiment described above, the four watermarked raster images are combined into a PostScript file as indicated in FIG. 1. In an alternate embodiment, the watermarking interpreter is embedded in, and is part of a particular printer. In such an embodiment, the watermarked raster images would be sent directly to the printing mechanism as is conventional. Embedding an interpreter in printers is conventional. In such a case after the raster images are watermarked, they would be directly printed rather than being combined into another PostScript file.

It is also noted that in some situations only one raster image is generated and in some situation three, four or more raster images are generated. For example if the colors are RGB, three raster images are generated. In the situations where the printing utilizes hexachrome (i.e. spot colors) there would be six raster images. The term set is used to mean the number of raster images generated for the particular application.

While the invention has been shown and described with respect to various preferred embodiments, it should be understood that that various changes and alterations can be made without departing from the spirit and scope of the invention. The scope of the invention is limited only by the appended claims.

What is claimed is:

1. A method comprising:
   interpreting a page description language (PDL) file;
   generating a plurality of raster images based on the PDL file;
   using a mask to determine one or more areas of the plurality of raster images that are not to be digitally watermarked;
   utilizing a processor, digitally watermarking each of the plurality of raster images to yield a digitally watermarked set of raster images, wherein the one or more areas determined using the mask are not digitally watermarked; and
   providing the digitally watermarked set of raster images to a printing device for printing of the digitally watermarked set of raster images.

2. The method recited in claim 1, wherein the PDL comprises PostScript.

3. The method recited in claim 1, wherein the interpreting is performed using a Ghostscript interpreter.

4. The method recited in claim 2, wherein the interpreting is performed using a Ghostscript interpreter.

5. A method comprising:
   accessing a display list comprising at least one of an image pipeline or a page pipeline;
   receiving a plurality of raster images from at least one of the image pipeline or the page pipeline, wherein the plurality of raster images represent at least a portion of a file which is represented in a page description language (PDL);
   obtaining a mask to guide steganographic encoding of at least one of the plurality of raster images, wherein the mask identifies one or more areas of the plurality of raster images that are not to be digitally watermarked; and
   utilizing at least one processor, steganographically encoding at least one of the plurality of raster images, wherein the one or more areas identified using the mask are not steganographically encoded with a digital watermark.

6. A computing device comprising:
   a memory configured to store a page description language (PDL) file; and
   a processor operatively coupled to the memory and configured to:
   interpret the PDL file;
   generate a plurality of raster images based on the PDL file;
   use a mask to determine one or more areas of the plurality of raster images that are not to be digitally watermarked;
   digitally watermark each of the plurality of raster images to yield a digitally watermarked set of raster images, wherein the one or more areas determined using the mask are not digitally watermarked; and provide the digitally watermarked set of raster images to a printing device for printing of the digital watermarked set of raster images.

7. A non-transitory computer readable medium having instructions stored thereon, the instructions comprising:

instructions to interpret a page description language (PDL) file;

instructions to generate a plurality of raster images based on the PDL file;

instructions to use a mask to determine one or more areas of the plurality of raster images that are not to be digitally watermarked;

instructions to digitally watermark each of the plurality of raster images to yield a digitally watermarked set of raster images, wherein the one or more areas determined using the mask are not digitally watermarked; and instructions to provide the digitally watermarked set of raster images to a printing device.

8. A computing device, comprising:

a memory; and a processor operatively coupled to the memory and configured to:

access a display list comprising at least one of an image pipeline or a page pipeline;

receive a plurality of raster images from at least one of the image pipeline or the page pipeline, wherein the plurality of raster images represent at least a portion of a page description language (PDL) file;

obtain a mask to guide steganographic encoding of at least one of the plurality of raster images, wherein the mask identifies one or more areas of the plurality of raster images that are not to be digitally watermarked; and steganographically encode at least one of the plurality of raster images, wherein the one or more areas identified using the mask are not steganographically encoded with a digital watermark.

9. A non-transitory computer readable medium having instructions stored thereon, the instructions comprising:

instructions to access a display list comprising at least one of an image pipeline or a page pipeline;

instructions to receive a plurality of raster images from at least one of the image pipeline or the page pipeline, wherein the plurality of raster images represent at least a portion of a page description language (PDL) file;

instructions to obtain a mask to guide steganographic encoding of at least one of the plurality of raster images, wherein the mask identifies one or more areas of the plurality of raster images that are not to be digitally watermarked; and instructions to steganographically encode at least one of the plurality of raster images, wherein the one or more areas identified using the mask are not steganographically encoded with a digital watermark.

10. The method of claim 5, further comprising transmitting the at least one steganographically encoded raster image to a printing device.

11. The method of claim 10, wherein the printing device is configured to print the at least one steganographically encoded raster image.

12. The device of claim 6, wherein the PDL comprises PostScript.

13. The device of claim 6, wherein the processor is further configured to execute at least one function of a watermarking program to digitally watermark each of the plurality of raster images.

* * * * *

UNITED STATES PATENT AND TRADEMARK OFFICE
CERTIFICATE OF CORRECTION

PATENT NO. : 8,228,563 B2  
APPLICATION NO. : 11/142827  
DATED : July 24, 2012  
INVENTOR(S) : Walton Page 1 of 1

It is certified that error appears in the above-identified patent and that said Letters Patent is hereby corrected as shown below:

On the Title Page, in the Figure, delete "  " and insert --  --, therefor.

On Title Page 2, Item (56), under "OTHER PUBLICATIONS", in Column 2, Line 12, delete "or" and insert -- for --, therefor.

On Title Page 2, Item (56), under "OTHER PUBLICATIONS", in Column 2, Line 13, delete "Iustitute" and insert -- Institute --, therefor.

In the Specifications:

In Column 2, Line 13, delete "DESCRIPTION" and insert -- DETAILED DESCRIPTION --, therefor.

Signed and Sealed this  
Twenty-seventh Day of August, 2013

Teresa Stanek Rea  
*Acting Director of the United States Patent and Trademark Office*